United States Patent [19]

Martin

[11] Patent Number: 5,201,446

[45] Date of Patent: Apr. 13, 1993

[54] FRUIT PICKER'S SUPPORTED CONTAINER

[76] Inventor: Fred J. Martin, Rte. 5, Box 5249B, East Wenatchee, Wash. 98802

[21] Appl. No.: 768,153

[22] Filed: Sep. 30, 1991

Related U.S. Application Data

[63] Continuation-in-part of Ser. No. 478,670, Feb. 12, 1990, abandoned.

[51] Int. Cl.⁵ .......................................... A01D 46/22
[52] U.S. Cl. .................................. 224/205; 224/236; 383/41; 383/67; 383/97; 206/523
[58] Field of Search ............. 224/202, 205, 207–212, 224/215, 216, 236, 901, 257–263; 383/33, 41, 67, 97, 109, 110, 66; 206/523; 220/904

[56] References Cited

U.S. PATENT DOCUMENTS

| | | | |
|---|---|---|---|
| 306,863 | 10/1884 | Robinson | 224/209 |
| 719,810 | 2/1903 | Jones | 383/41 X |
| 978,429 | 12/1910 | Barnett | 383/67 X |
| 986,573 | 3/1911 | Jackson | 224/209 |
| 1,017,721 | 2/1912 | Williams | 383/67 X |
| 1,137,303 | 4/1915 | Carpenter | 224/209 |
| 1,454,779 | 5/1923 | Wells et al. | 224/209 |
| 1,875,585 | 9/1932 | Freimann et al. | 224/202 |
| 1,992,849 | 2/1935 | Walter | 224/216 |
| 2,130,926 | 9/1938 | Stone | 224/216 |
| 2,163,501 | 6/1939 | Speicher et al. | 224/215 |
| 4,102,376 | 7/1978 | Sharp | 206/523 X |
| 4,185,673 | 1/1980 | Daniello | 206/523 X |
| 4,691,370 | 9/1987 | MacFee | 383/97 X |
| 4,768,233 | 9/1988 | Grilliot et al. | 2/81 |
| 4,793,532 | 12/1988 | Cash | 224/202 |
| 4,815,640 | 3/1989 | Johnson | 224/202 |
| 4,925,071 | 5/1990 | Fleming et al. | 224/207 |
| 4,927,046 | 5/1990 | Armstrong | 220/90 |
| 5,050,998 | 9/1991 | Wachtel | 383/67 X |

Primary Examiner—Henry J. Recla
Assistant Examiner—Casey Jacyna
Attorney, Agent, or Firm—Roy E. Mattern, Jr.

[57] ABSTRACT

A fruit picker's supported container, has a back for comfortable bag-like fitting against a user's body, and completed front and left and right sides, which are firm, rigid, fixed, non-yielding, by using in part, a preformed partial circular arc laminate of high density polyethylene plastic, to protect the picked fruit inside the container from bruising caused by front and side forces, such as when a ladder or tree branch is bumped. Initially the back, front, left and right sides of the container, which form a bucket like volume, are formed of a laminated arrangement of an interior lining or lamination layer of fabric, a middle lamination of open cell foam plastic insulation, and an outer cover or lamination layer of fabric. A depending skirt is made of only a layer of fabric. On a smaller container, quick release fasteners on narrow straps are used in preparation for emptying small fruit, via the skirt. On a larger container, longer narrower straps are equipped with spring biased clamp buckles for emptying of large fruit, via the unfolded skirt. A full length zipper extends from the top center of the container back, downwardly throughout the bucket like volume and the skirt. When the zipper is unfastened, the container is opened, for cleaning and storage, almost to a planar configuration, being restrained only by the preformed partial circular arc curved plastic laminate, which remains firm, rigid, fixed, and non-yielding.

20 Claims, 3 Drawing Sheets

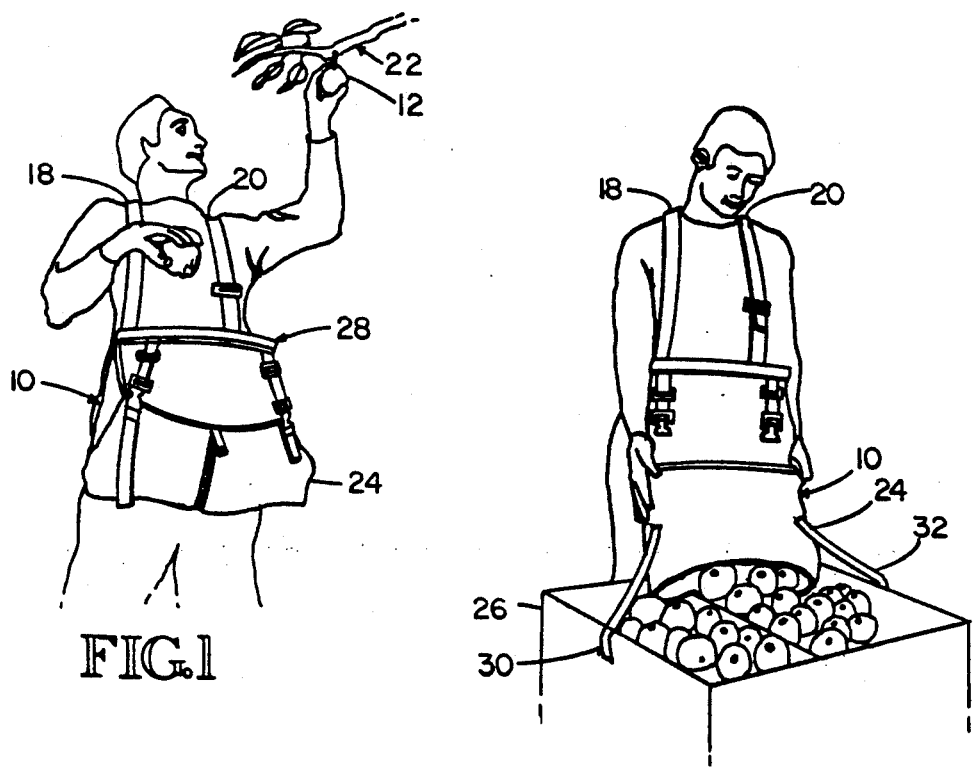
FIG.1
FIG.2
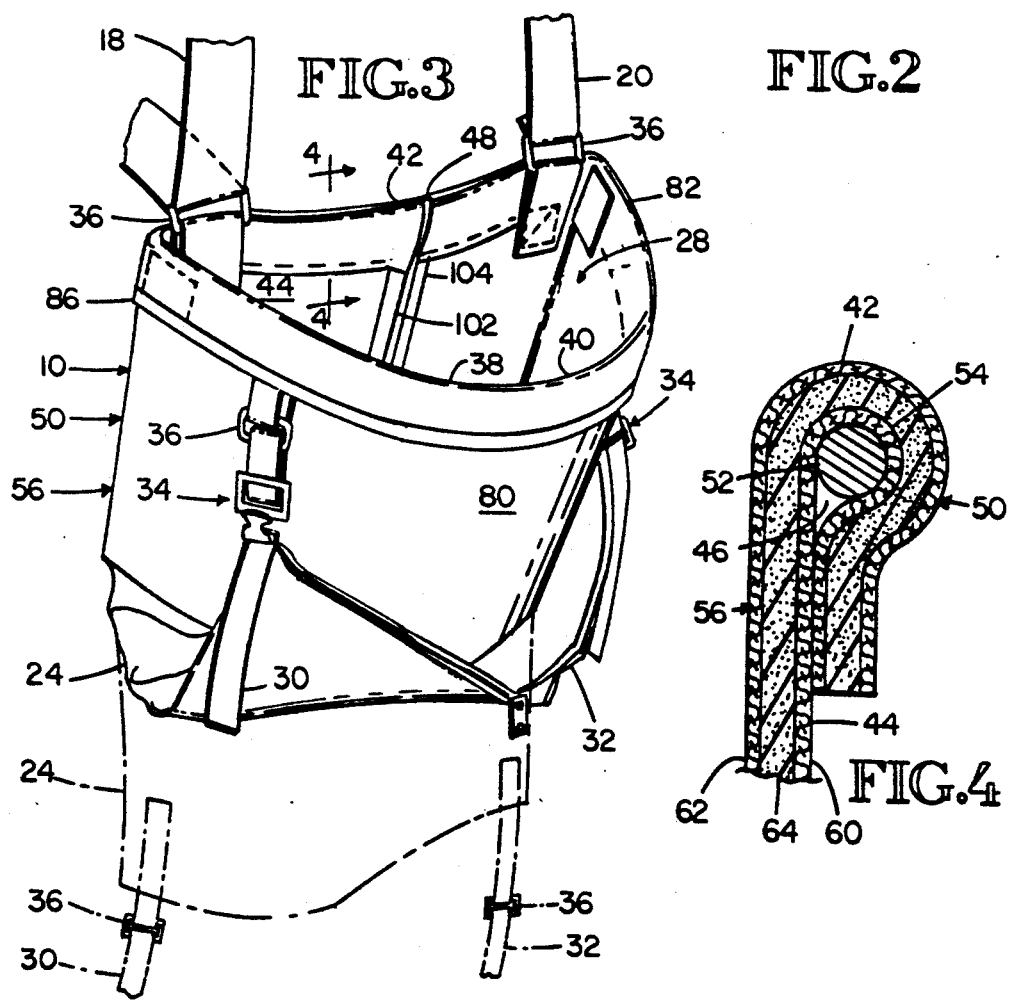
FIG.3
FIG.4

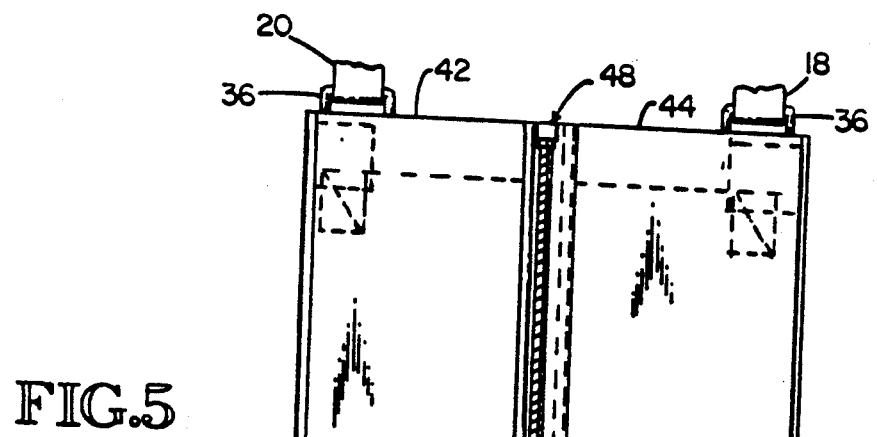
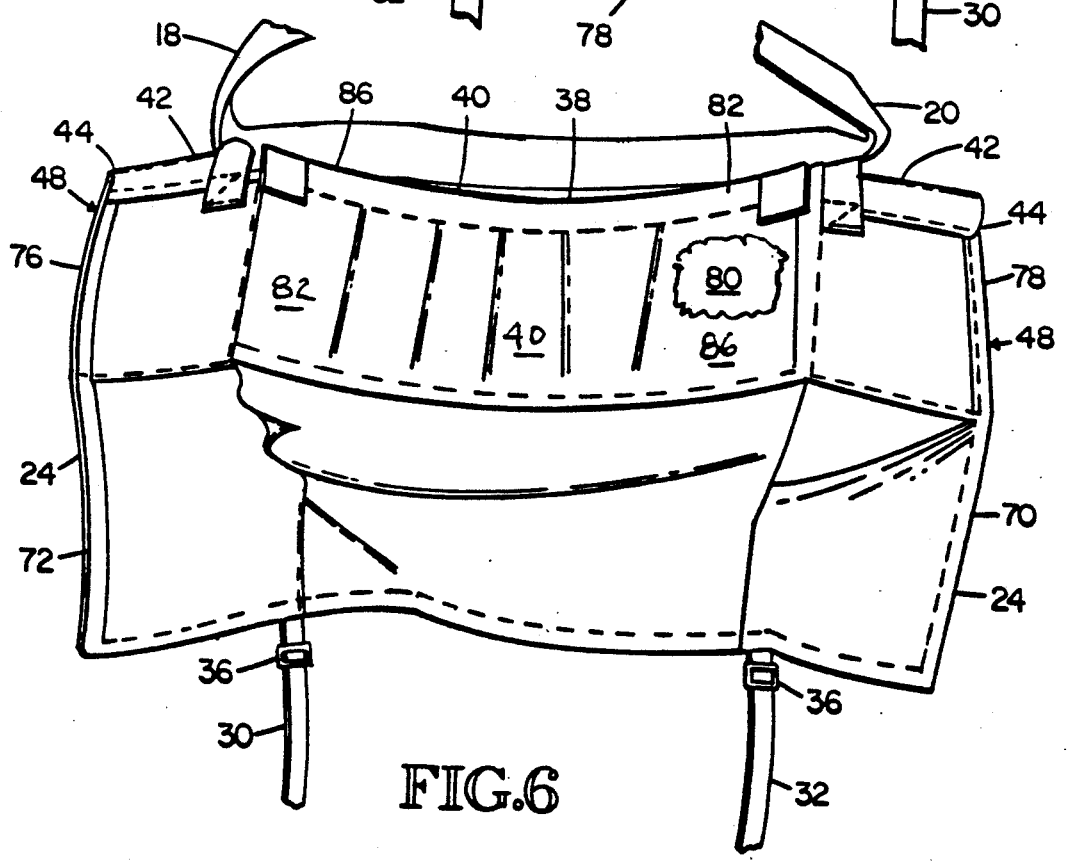

FRUIT PICKER'S SUPPORTED CONTAINER

CROSS REFERENCE

This application is a continuation in part application, of copending application Ser. No. 07/478,670, filed Feb. 12, 1990 now abandoned by the same Applicant, Fred J. Martin, and having the same amended title and same drawings, and the priority of this first application is claimed.

BACKGROUND

Special bags and buckets have been and are being supplied to fruit pickers to increase their efficiency and comfort and to protect the fruit being picked. They have two over shoulder straps or one over strap and an around waist strap.

Generally the top opening of a bag is kept open by providing a top rod frame opening. The rod frame in some bag containers is continued below. All such rod frame members are padded to avoid the bruising of the fruit. Bag portions extend down from the rod frame portions to form the volume receiving the fruit. Beyond the bag portions, skirt portions are provided, which remain essentially folded up, until the picked fruit is emptied from the bag by the picker, who releases the skirt portions carefully to allow the fruit to slowly leave the bag.

Metal and plastic buckets, with similar fasteners and straps and having fabric skirts are used and preferred, when essentially complete protection of the fruit from bruising is wanted.

Bags and buckets are lined with polyfoam to minimize the bruising and culls of the fruit. Also bags are lined with foam plastic which also serves as an insulation.

During the examination of the fruit picker's supported container illustrated and described in application Ser. No. 07/478,670, the following cited reference patents were considered.

In U.S. Pat. No. 4,925,071 of 1990, Jerry A. Fleming illustrated and described his fruit picker's bag which is well padded However his bag had no firm, rigid, fixed, non-yielding, portions to protect the fruit from bruising caused by front and side forces.

In U.S. Pat. No. 4,403,636 of 1983, Robin D. Lopez disclosed his laundry bag with side zippers, so the laundry bag may be laid out flat to receive laundered items, and thereafter be closed, avoiding their wrinkling.

In U.S. Pat. No. 2,130,976 of 1938, Henry D. Stone illustrated and described a harvesting basket having keeper members at the ends of cords holding up a folded bottom of the basket.

In U.S. Pat. No. 1,992,849 of 1935, Martin T. Walter disclosed his fruit picker's sack made of flexible material, such as canvas or duck.

In U.S. Pat. No. 1,070,489 of 1913, Tsuaeaburo Kuroda illustrated and described his fruit picker's sack made of materials which are not firm nor rigid, and the materials are arranged to provide a laced side seam for size adjustments.

In U.S. Pat. No. 3,053,005 of 1962, George Byers disclosed his easy to clean fish bag having side eyelets and laces used initially to form the fish bag, and then subsequently to return the bag materials to an opened planar arrangement for their cleaning.

In U.S. Pat. No. 1,137,303 of 1915, C. A. Carpenter illustrated and described his fruit gathering bag which does not have a firm or rigid portion.

In U.S. Pat. No. 1,454,779 of 1923, A. Z. Wells and J. M. Wade disclosed their fruit picking bucket, wherein the body thereof is constructed entirely of metal all the way around. A spout-like bottom of flexible material is extendable below the metal body. Padding was used.

In U.S. Pat. No. 986,573 of 1911, T. J. Jackson illustrated and described his fruit bag, which is essentially made of non rigid bag materials.

In U.S. Pat. No. 4,768,233, William and Mary Grilliot disclosed their fire fighter's garment having a removable, but necessary, inner liner serving as a thermal barrier, and a protected zipper.

In French patent 7,538,621 of 1977, Georg Essl illustrated and described his satchel having shoulder straps. It was stiffened internally on the bottom, sides, and back in a backpack like way. The outside of the back was covered with a layer of plastic foam to make the wearing of this backpack more comfortable.

In U.S. Pat. No. 1,166,707 of 1916, William Monroe disclosed his fruit picking sack made of canvas, and having an interlining made of burlap, or other suitable material, to protect fruit from being bruised, and having leather straps and edges, and also having an adjustable volume by using ropes and cleats.

Even though these previous patents illustrated and described many fine products, there still remained a need for a better fruit picker's supported container.

SUMMARY

A fruit picker is provided with a container he or she will comfortably and readily use which provides the lighter weight and better comfort of a bag, and the stronger protection of a bucket. In respect to the volume of the container into which the fruit is carefully placed, until the container is to be emptied, the back portion has the bag features and the front and side portions, formed on an arc, to be rigid, fixed, firm, non-yielding, have the bucket features.

All upright sides of this volume receiving the fruit are made of laminations. There is an interior lining or lamination layer of fabric, a middle lamination of foam insulation, and an outer cover or lamination layer of fabric. Then the combined curved front and sides are covered by an additional preformed curved lamination of then rigid, firm, fixed, non-yielding high density polyethylene plastic, providing bucket like protection to the picked fruit. All the depending skirt portions, used in guiding the fruit down and out of the fruit picker's supported container, are made of only a layer of fabric. These fabric laminations are made of a material such as polypropylene material manufactured by "Amoco" Company and designated as "PROPX 3", which is mold and mildew resistant, has a high tear and puncture strength and has a high resistance to wear and abrasion. The fabric laminations fully protect the foam insulation.

The container includes a full length zipper, which when released, opens the container to an almost planar configuration, except as interrupted by the then rigid, firm, fixed, non-yielding, curved lamination of high density polyethylene plastic which always remains curved during the useful life of this fruit picker's supported container. This zipper extends from the top of the center of the back of the container and down to the bottom of the skirt in respect to when the skirt is in the unloading position. The container in this opened position is readily cleaned, stored, and/or shipped. There are full length covering portions for covering over all the standard portions of the zipper, to prevent fruit juices from leaking into and through the standard portions of the zipper.

No continuous rod top opening frame member is used. On the larger size container and also on the smaller size container, however, a curved rod is inserted into leather protected overlapped top seam portions, while the zipper is released. Then when the zipper is fastened, the curved rod provides firmness of the container at this location of body contact and the container becomes more supportive of the picked fruit. Also on the larger size container, the removable narrower control straps and fasteners therefore, used in drawing up and slowly lowering away the skirt portion, are always readily available within a picker's convenient arm's length. Moreover, spring biased clamp buckles are used with these narrower control straps for effectively controlling the speed of elongating the effective length of these initially overlapped longer straps, during the emptying of large fruit, via the skirt. Preferably quick release buckles are used on the narrower straps of the smaller container.

DRAWINGS

Preferred embodiments of the fruit picker's supported container are illustrated in the drawings, wherein:

FIG. 1 is a perspective view of a picker supporting the container while picking larger fruit, such as apples, which he is carefully placing in this container that provides the lighter weight and comfort of a bag, and the stronger fruit protection of a rigid, firm, fixed, non-yielding bucket;

FIG. 2 is a perspective view, somewhat like FIG. 1, showing, however, how the picker is emptying his container;

FIG. 3 is a perspective view of the fruit picker's supported container, when it is zipped together and then folded together and fastened, via fasteners and straps, to be used as the container, which then provides the fruit receiving volume into which the picker carefully places each picked fruit;

Figure 7:
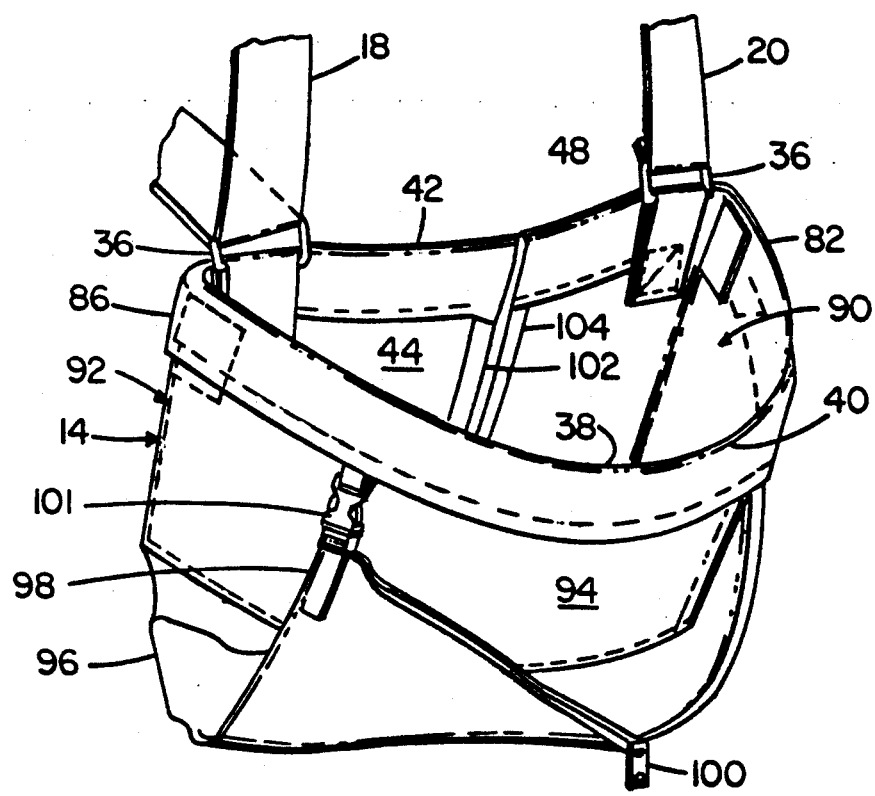

FIG. 4 is a cross sectional view taken along line 4-4 of FIG. 3, which is just off the centerline, to illustrate the bag portion laminations of an outer cover lamination of fabric, a middle lamination of open cell plastic insulation, and an inside cover lamination of fabric, and also showing how overall folded over bag portions form the top edge of the container, and these portions, supplemented by protective leather, receive an optional curved metal bar, which braces and forms the top edge of this back of this bag portion to conform to the body of the fruit picker;

FIG. 5 is a rear elevational view of the picker's supported container in the fruit emptying configuration, illustrating the central location of the full length zipper;

FIG. 6 is a rear elevational view of the picker's supported container after the zipper has been fully opened, indicating how readily this container may be thoroughly cleaned, stored, and shipped, and showing how the preformed high density polyethylene plastic remains as a firm, rigid, fixed, non-yielding partial circular arc laminate, and showing how the fabric portions of the bag are stitched against the inside surface of this partial circular arc laminate;

FIG. 7 is a perspective view like FIG. 1, showing, however, a smaller embodiment of the fruit picker's supported container which is used during the picking of smaller fruit such as cherries.

DESCRIPTION OF PREFERRED EMBODIMENTS

In the drawings a preferred embodiment of the fruit picker's supported container 10 which is larger and used during the picking of larger sized fruit 12, such as apples 12, is illustrated in FIGS. 1 through 6. Another embodiment, which is a smaller container 14 and used during the picking of smaller sized fruit such as cherries, is illustrated in FIG. 7.

In FIG. 1 a person is shown supporting the larger fruit picker's container 10 by using crossed over removable two inch cotton webbing shoulder straps 18, 20, while the fruit picker is carefully picking a larger fruit such as an apple 12 from a tree 22. In FIG. 2, this person is shown carefully emptying this container 10, after the skirt 24 thereof, has been unfolded and directed downwardly on an angle into a transporting container 26 receiving apples 12, often from several pickers.

The fruit picker's supported container 10, is shown by itself in FIG. 3 indicating by solid lines how it is zipped together and folded together to provide the picked fruit receiving volume 28, as also shown in FIG. 1. This fruit receiving volume 28, as viewed from outside, is the upright portion of this fruit picker's supported container, and it has upper and lower end portions. Then as also shown in FIG. 3 by phantom lines, the skirt 24, or skirt portion, is foldably connected to the upright portion at the lower end portion thereof, in its depending fruit discharge configuration, as also shown in FIG. 2. Left and right adjustable, removable, narrower, controlling and positioning straps 30, 32, with adjustment buckles 34, preferably being spring biased clamp buckles 34, via a mutual connecting ring 36 are removably secured to the top 38 edge of the front 40 of this larger container 10 for larger fruit 12. These controlling straps 30, 32, preferably one inch wide, when secured and when released, are within the picker's arm's reach for their convenient manipulating, adjustment, and securement. Also these controlling straps 30, 32 with their spring biased clamp buckles 34, which always remain within the picker's arm's reach, make the release for dumping the fruit a quick operation to be done in seconds. Also these straps 30, 32 and buckles 34 make the reestablishment of the bottom of this fruit picker's supported container, a very quick operation to be done in seconds. These control straps are removably secured to other mutual connecting rings 36, and like strap portions to the lowered portions of the skirt 24. As the emptying of the fruit, down through the unfolding skirt 24, is commenced, the spring biased clamp buckles 34 are conveniently manipulated to reduce the clamping forces, allowing the initially folded over straps 30, 32 to gradually increase in their overall length, so the fruit will not be harmfully dumped too rapidly into the transporting container 26, as shown in FIG. 2.

Inside the top edge 42 of the back 44 is a longitudinal receiving volume 46 extending on opposite sides of centrally located zipper 48, as shown in FIG. 4. It is formed by overlapping the laminated bag material 50. This receiving volume 46 is partially lined by a leather portion 52 to resist wear. When the zipper 48 is opened sufficiently, a curved metal rod 54 is inserted into this longitudinal receiving volume 46. Thereafter, the zipper 48 is closed again, and this rod 54 serves to maintain the contoured top edge 42 of the back 44 of this larger container 10, which comfortably fits curved body portions of the fruit picker.

The laminated bag material 50 which is arranged throughout all of the upright portions 56 of this larger container when it is folded up and zipped together to create the picked fruit receiving volume 28, is illustrated, in part, in FIG. 4. The interior lining lamination 60, and the exterior lamination 62, are preferably made of a polypropylene fabric material, such as a fabric designated as "PROPX 3", manufactured by the "Amoco" company. This fabric is mold and mildew resistant, has high tear and puncture strength, and has high resistance to wear and abrasion. These fabric laminations 60, 62, which are alike, protect the middle lamination 64 which is an open cell plastic that serves as insulation material.

When this larger container 10 is unfolded and viewed from the back as illustrated in FIG. 6, the full extent of the length of the zipper 48 is observed, and also as shown in figure 5. It commences at the center of the top edge 42 of the back 44 and extends down, when the skirt 24 is lowered, to the then bottom edge 66 of the skirt 24. The back 44 of this larger container 10, in reference to providing the picked fruit receiving volume 28, extends down to the sewn seam 68, which is at the bottom location of this receiving volume 28. From the top edge 42 to this seam 68, the laminated bag material 50 comprises the three laminations, two being the interior 60 and exterior 62 fabric laminations, and the third and middle lamination being the open cell insulation 64 as shown in FIG. 4. Beyond this sewn seam 68 the skirt 24 is made of one single lamination 70 of the fabric made of polypropylene fabric material 72, which then serves to guide the departing fruit 12, as shown in FIGS. 2 and 3.

Also as shown in the rear elevation view of FIG. 6, the bag portions are shown as they are stitched adjacent the rigid firm fixed non-yielding curved plastic lamination 80. These secured bag portions are the left side 82, front side 40, and right side 86. Portions of the right side 86 of the bag portions are illustrated, as removed, to show the plastic lamination 80.

When this larger container 10 is to be cleaned, stored, and/or shipped, the zipper 48 is opened and the two zipper portions 76 and 78 are separated and fruit picker's larger container 10 is arranged almost into a planar configuration, as illustrated in FIG. 6, being restrained only by a rigid, firm, fixed, non-yielding, curved plastic lamination 80. This plastic material serving as the lamination 80 is sewn, or otherwise secured, to the otherwise left side 82, the front side 40, and the right side 86 of the picked fruit receiving volume 28, that is formed when this larger container is arranged in the zipped together folded up picking time configuration, as shown in FIGS. 1 and 2.

This rigid, firm, fixed, non-yielding, curved plastic lamination 80, sewn adjacent the exterior lamination 62 of fabric, as shown in FIGS. 1, 2, 3, and 6, is preferably made of a high density polyethylene plastic. It is used to prevent the fruit from being bruised, which otherwise might occur, if the picker moved the container 10 striking a ladder or a tree branch. The utilization of this rigid, firm, fixed, non-yielding, curved plastic lamination 80 provides this benefit, thereby protecting the fruit, which is like the similar benefit provided by using complete metal or plastic buckets which are rigid, firm, fixed, non-yielding. In contrast, however, the balance of the overall structure of this larger container 10, is comparable to the overall structure of a fruit picker's bag. Therefore this larger container 10 has the best features, combined, of a fruit picker's bag, and a fruit picker's bucket.

A smaller fruit picker's supported container 14 is illustrated in FIG. 7, which likewise has the best features, combined, of a fruit picker's bag, and a fruit picker's bucket. It is used when smaller fruit, such as cherries, are being picked. A smaller picked fruit receiving volume 90 is needed. Therefore all the upright sides 92, the curved plastic lamination 94, the skirt 96, are shorter in their respective vertical dimensions. In addition, the left and right narrower straps 98, 100, used for holding the folded up skirt 96 are shorter, and quick release buckle fasteners 101 are used when the fruit emptying time comes. The optional curved metal rod 54 is available to make this smaller container 14 firmer and more supportive, when receiving fruit, while supported by the fruit picker. Also to protect the standard zipper components 48 from juices of fruit, and to keep the juices of the fruit from leaking out of the bag, a relatively large overall protective flap 102 is sewn in place adjacent the zipper 48 to further cover the zipper, when this flap 102 is secured by the respective portions of an overall "Velcro" fastener 104 or a like purpose hook and loop fastener. The zipper 48 has or may have its own separate side smaller protectors. However, these smaller protectors do not adequately keep the fruit juices from entering the zipper nor from leaking through the zipper. This protective flap 102 and the "Velcro" fastener 104, also may be used on the larger container 10. In all other respects of manufacture and utilization of materials this smaller fruit picker's supported container 14 is the same as the larger container 10. Also it is used by pickers in similar ways during picking times.

By using one or the other of these embodiments, or ones closely related thereto, pickers are provided with a fruit picker's supported container 10 and/or 14, which they comfortably carry and utilize during a prospective long overall service time of the utilization of these containers, as shown in FIGS. 1 and 2. Throughout this service time, when fruits are in the picked fruit receiving volumes 28 and 90, they are very well protected from bruising, if by chance a ladder, tree branch, or other object is bumped into, via the protection of the rigid, firm, fixed, non-yielding, curved plastic laminations, 80 or 94. All the straps are removable and thereby easily cleaned and/or replaced. When needed for support and fit, the curved metal rod 54 is conveniently inserted along the top edge 42 of the back 44. A respective container then becomes firmer and more supportive, when receiving fruit, while supported by a fruit picker. During periods of necessary cleaning, storage, and/or shipping, the opening of the zipper 48 leads the way for the pickers to arrange their containers 10 or 14 into an almost planar configuration, as shown in FIG. 6. In this configuration, these fruit picker's supported containers, 10 and 14, are conveniently and thoroughly cleaned.

I claim:

1. A fruit picker's supported container having a picked fruit receiving volume, and having the fruit protection offered by use of a bucket and the lightness and comfort offered by use of a bag, comprising:

a) upright portions of this container's picked fruit receiving volume, which are bag-like back, sides, and front of this fruit receiving volume;

b) a rigid, firm, fixed, non-yielding, formed plastic material serving as a laminate which is secured to the entire sides and entire front of these upright portions, this rigid, firm, fixed, non-yielding laminate covering the entire sides and entire front for thereby serving to protect the picked fruit in the picked fruit receiving volume from forces occurring, if a ladder of a tree branch is struck;

c) foldable skirt portions which are secured to and depending from the upright portions, which, when unfolded, form a discharge passageway for the picked fruit being released from the picked fruit receiving volume of this container, and, when folded, form a bottom of the picked fruit receiving volume;

d) straps and fasteners which are secured to this container and which are conveniently reachable at all times when this container is supported, are used by a fruit picker to keep the foldable skirt in place, then serving as a bottom of the picked fruit receiving volume of this container during the picking time, and to thereafter, after the picking time, to release the skirt, when this container is being emptied;

e) shoulder straps which are secured to the upright portions at the back of this container for passing over the shoulders of the fruit picker during the fruit picking time and the fruit discharging time; and f) a zipper which extends from the top of the upright portions at the back of this container, and down to the bottom of the skirt in the released position thereof, and when the zipper is released, this container is arranged essentially flat, except as constrained by the rigid, firm, fixed, non-yielding, formed plastic material serving as a laminate, thereby facilitating the cleaning, storage, and shipping of this container.

2. A fruit picker's supported container, as claimed in claim 1, wherein the upright portions are laminated, having an interior lining lamination layer of fabric, a middle insulation lamination, and an outer cover lamination layer of fabric.

3. A fruit picker's supported container as claimed in claim 1, wherein the foldable skirt portions comprise only a single layer of fabric bag material.

4. A fruit picker's supported container, as claimed in claim 1, wherein the top edges of the upright portions support folded over layers of fabric bag material.

5. A fruit picker's supported container, as claimed in claim 1, wherein the top edges of the upright portions have folded over layers of fabric bag material, and along the back of this container on opposite sides of the zipper, a curved bar is inserted within the folded over layers of fabric bag material creating a formed firm support of the back of this container, which, during use of the container, bears comfortably against the body of the fruit picker.

6. A fruit picker's supported container, as claimed in claim 5, wherein the upright portions are laminated, having an interior lining lamination layer of fabric bag material, a middle insulation lamination, and an outer cover lamination layer of fabric bag material.

7. A fruit picker's supported container, as claimed in claim 6, wherein the foldable skirt portions comprise only a single layer of fabric bag material.

8. A fruit picker's supported container, as claimed in claim 1, having an overall protective flap sewn in place adjacent the zipper, often having its own side flaps, to cover the entire zipper to further protect the zipper from fruit juices, and to keep the fruit juices from leaking out of this container.

9. A fruit picker's supported container as claimed in claim 8, having a hook and loop fastener to hold the overall protective flap in place over the zipper.

10. A fruit picker's supported container, as claimed in claim 1, wherein the straps and fasteners, include quick release buckles to release these straps during emptying small fruit via the skirt.

11. A fruit picker's supported container, as claimed in claim 10, wherein the straps and fasteners, include connecting rings, serving in making the straps conveniently removable for cleaning and eventually for replacement.

12. A fruit picker's supported container having a picked fruit receiving volume, and when picked fruit is in this picked fruit receiving volume it is well protected by the like protection offered by using a bucket, and yet this container is comparatively light in reference to the lightness and comfort offered by using a bag, comprising:

a) upright portions of this container's picked fruit receiving volume which are bag-like back, sides, and front of this fruit receiving volume;

b) a rigid, firm, fixed, non-yielding, formed plastic material, serving as a laminate, which s preformed on an arc and which is then secured to the entire sides and entire front of these upright portions, and covers the entire sides and entire front, serves to protect the picked fruit in the picked fruit receiving volume from forces occurring, if a ladder or a tree branch is struck;

c) foldable skirt portions, which are secured to and depending form the upright portions, which when unfolded form a discharge passageway from the picked fruit being released form the picked fruit receiving volume of this container, and when folded form a bottom of the picked fruit receiving volume;

d) straps and fasteners, which are secured to this container, and which are conveniently reachable within arms length at all times when this container is supported are, used by a fruit picker to keep the foldable skirt in place, then serving as a bottom of the picked fruit receiving volume of this container during the picking time, and to thereafter, after the picking time, to release the skirt in seconds of time, when this container is being emptied, and to reestablish the bottom of this container in seconds of time;

e) shoulder straps, which are secured to the upright portions at the back of this container for passing over the shoulders of the fruit picker during the fruit picking time and the fruit discharging time; and f) a zipper extending from the top of the upright portions of the back of the container, and down to the bottom of the skirt in the released position thereof, and when the zipper is released, this container is arranged essentially flat, except as constrained by the rigid, firm, fixed, non-yielding, formed plastic material serving as a laminate formed on an arc, thereby facilitating the cleaning, storage, and shipping of this container.

13. A fruit picker's supported container, as claimed in claim 12, wherein the top edges of the upright side portions have folded over layers of fabric bag material, and along the back of this container on opposite sides of the zipper, a curved bar is inserted within the folded over layers of fabric bag material creating a formed firm support of the back of this container, which, during use of the container, bears comfortably against the body of the fruit picker, and the container becomes firmer and more supportive, when receiving the fruit, while supported by the fruit picker.

14. A fruit picker's supported container, as claimed in claim 13, wherein the upright portions are laminated, having an interior lining lamination layer of fabric bag material, a middle insulation lamination, and an outer cover lamination layer of fabric bag material.

15. A fruit picker's supported container, as claimed in claim 14, wherein the foldable skirt portions comprise only a single layer of fabric bag material.

16. A fruit picker's supported container, as claimed in claim 15, wherein straps and fasteners include spring biased clamp buckles, manipulated by a fruit picker, to controllably increase the overall effective length of a folded strap, during emptying large fruit via the skirt.

17. A fruit picker's supported container, as claimed in claim 16, wherein the straps and fasteners, include connecting rings, serving in making the straps conveniently removable for cleaning and eventually for replacement.

18. A fruit picker's supported container, as claimed in claim 15, having an overall protective flap sewn in place adjacent the zipper, often having its own side flaps, to cover the entire zipper to further protect the zipper from fruit juices, and to keep the fruit juices from leaking out of this container.

19. A fruit picker's supported container, as claimed in claim 18, having a hook and loop fastener to hold the overall protective flap in place over the zipper.

20. A fruit picker's support container, comprising:
 a) a container with an upright portion having upper and lower end portions;
 b) a skirt portion foldably connected to said upright portion at said lower end portion thereof serving as a bottom when enfolded, and serving as a fruit guiding chute when unfolded;
 c) said upright portion including front, rear and sides;
 d) said front, rear and sides comprising initially only a pliable material and forming with the folded skirt portion a bag-like configuration;
 e) said front, rear and sides with the folded skirt portion defining a volume for receiving the picked fruit;
 f) said front subsequently also including rigid, firm, fixed, non-yielding means completely covering the entire front side, for protecting the picked fruit received in said volume; and
 g) wherein said upright portion of the container is rigid, firm, fixed, non-yielding in the front and pliable in the rear.

* * * * *